United States Patent
Yuan et al.

(10) Patent No.: US 8,479,241 B2
(45) Date of Patent: Jul. 2, 2013

(54) SYSTEM AND METHOD TO CONTROL COMMUNICATION OF DATA

(75) Inventors: Chin Yuan, San Ramon, CA (US); Cheng-Hong Hu, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 684 days.

(21) Appl. No.: 11/801,582

(22) Filed: May 10, 2007

(65) Prior Publication Data
US 2008/0279100 A1 Nov. 13, 2008

(51) Int. Cl.
*H04N 7/173* (2006.01)
(52) U.S. Cl.
USPC ............... 725/95; 725/93; 725/94; 725/96
(58) Field of Classification Search
None
See application file for complete search history.

(56) References Cited

U.S. PATENT DOCUMENTS

| | | | | |
|---|---|---|---|---|
| 4,916,525 | A * | 4/1990 | Drummond | 348/432.1 |
| 6,211,901 | B1 * | 4/2001 | Imajima et al. | 725/93 |
| 7,478,414 | B1 * | 1/2009 | Glusker et al. | 725/9 |
| 2002/0112239 | A1 * | 8/2002 | Goldman | 725/46 |
| 2002/0126698 | A1 * | 9/2002 | Deshpande | 370/467 |
| 2003/0037140 | A1 * | 2/2003 | Aaltonen | 709/225 |
| 2003/0065611 | A1 | 4/2003 | Li et al. | |
| 2003/0076857 | A1 * | 4/2003 | Morita et al. | 370/466 |
| 2003/0118014 | A1 * | 6/2003 | Iyer et al. | 370/389 |
| 2004/0146006 | A1 * | 7/2004 | Jackson | 370/230 |
| 2004/0230994 | A1 | 11/2004 | Urdang et al. | |
| 2005/0002331 | A1 * | 1/2005 | Nolle et al. | 370/229 |
| 2005/0044142 | A1 * | 2/2005 | Garrec et al. | 709/204 |
| 2005/0081243 | A1 | 4/2005 | Barrett et al. | |
| 2005/0235308 | A1 * | 10/2005 | Dellow et al. | 725/25 |
| 2006/0037037 | A1 | 2/2006 | Miranz | |
| 2006/0171390 | A1 * | 8/2006 | La Joie | 370/390 |
| 2006/0248213 | A1 | 11/2006 | Sherer et al. | |
| 2006/0280119 | A1 | 12/2006 | Karamanolis et al. | |
| 2007/0056002 | A1 | 3/2007 | Ganesan et al. | |
| 2007/0058627 | A1 * | 3/2007 | Smith et al. | 370/390 |
| 2007/0136753 | A1 * | 6/2007 | Bovenschulte et al. | 725/46 |
| 2008/0243924 | A1 * | 10/2008 | Barrett et al. | 707/104.1 |

* cited by examiner

*Primary Examiner* — Cai Chen
(74) *Attorney, Agent, or Firm* — Toler Law Group, PC

(57) ABSTRACT

Systems and methods of controlling communication of data are provided. A method of controlling communication of data may include receiving, at a network component, a request for data associated with a data source. The network component may have a limited capacity to distribute data. The method also includes determining whether the network component is exceeding a first capacity threshold. When the network component is exceeding the first capacity threshold, the method includes determining whether the data source meets a popularity criterion. When the data source meets the popularity criterion, the method includes sending the data associated with the data source.

26 Claims, 5 Drawing Sheets

SYSTEM AND METHOD TO CONTROL COMMUNICATION OF DATA

FIELD OF THE DISCLOSURE

The present disclosure is generally related to systems and methods to control communication of data.

BACKGROUND

Data distribution networks may include devices with limited capacity to distribute data. For example, routers may have limited bandwidth capacity or servers may have limited cache memory from which to transmit data. As users connect to data sources to request data and disconnect from the data sources, the available capacity of each network component may change. Hence there is a need for an improved system and method to control communication of data.

DETAILED DESCRIPTION OF THE DRAWINGS

In a particular embodiment, a system to control communication of data includes an input to receive a request at a network component for data associated with a data source. The network component may have a limited capacity to distribute data. The system also includes a popularity module to determine whether the data source meets a popularity criterion, when the network component is exceeding a first capacity threshold. The system also includes logic to authorize sending of the data associated with the data source when the data source meets the popularity criterion.

In a particular embodiment, a method of controlling communication of data includes receiving, at a network component, a request for data associated with a data source. The network component may have a limited capacity to distribute data. The method also includes determining whether the network component is exceeding a first capacity threshold. When the network component is exceeding the first capacity threshold, the method includes determining whether the data source meets a popularity criterion. When the data source meets the popularity criterion, the method includes sending the data associated with the data source.

In a particular embodiment, a processor-readable medium includes processor-readable instructions executable by a processor to determine whether the network component is exceeding a first capacity threshold of a limited capacity to distribute data in response to a request received at a network component for data associated with a data source. The processor-readable instructions are also executable by the processor, when the network component is exceeding the first capacity threshold, to determine whether the data source meets a popularity criterion. The processor-readable instructions are also executable by the processor, when the data source meets the popularity criterion, to authorize sending of the data associated with the data source.

Figure 1:
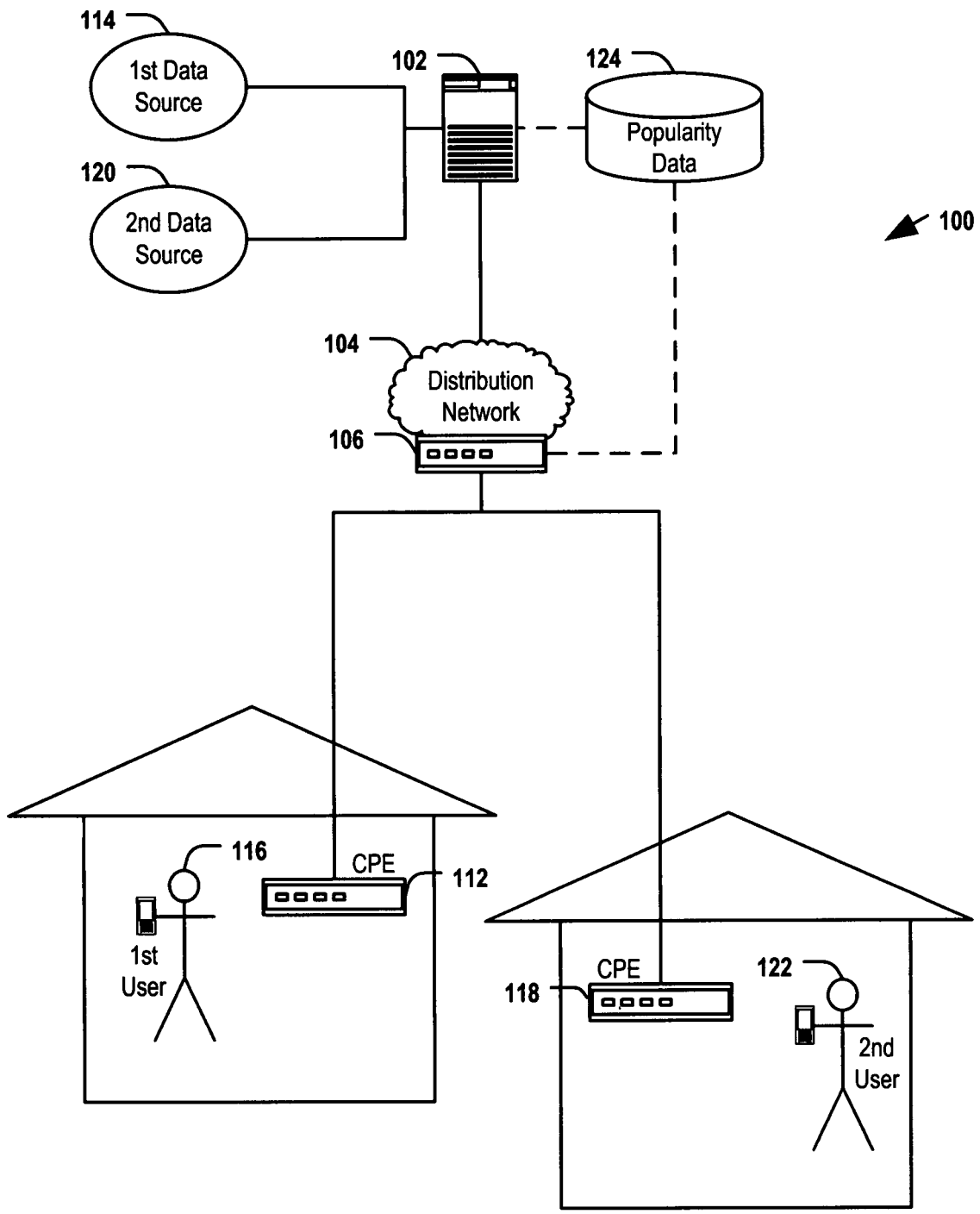
FIG. 1 is a diagram of a first embodiment of a system to control communication of data.

FIG. 1 is a diagram of a first embodiment of a system to control communication of data, generally designated 100. The system includes a content server 102 configured to receive data from one or more content sources, such as a first data source 114 and a second data source 120, and to communicate the data to a plurality of user devices, such as customer premises equipment (CPE) devices 112 and 118, via a distribution network 104. The distribution network 104 may include one or more routers 106 to send data to one or more of the CPE devices 112, 118. In a particular embodiment, the distribution network 104 may include or be associated with an Internet Protocol Television (IPTV) system. For example, the first data source 114 may include or be associated with a first television channel of the IPTV system, and the second data source 120 may include or be associated with a second television channel of the IPTV system.

In a particular embodiment, the router 106 may have a limited capacity to send data to CPE devices 112, 118. For example, the router may have a limited bandwidth. To ensure that users, such as a first user 116 and a second user 122, receive quality service, the router 106 may include an access control mechanism. The access control mechanism may prevent the router 106 from accepting more connections that the router 106 can service. For example, where the distribution network 104 is part of an IPTV system, the router 106 may be a multicast router, and each IPTV channel may be associated with a multicast group. The router 106 may be able to multicast a limited number of channels. Each channel routed by the router 106 may be associated with a particular amount of the router's available bandwidth. Associating each channel with a particular amount of bandwidth may allow the router to ensure the quality of service (QoS) of each channel.

In a particular embodiment, when the first user 116 is receiving data from the first data source 114 via the router 106, a certain portion of the router's capacity to distribute data is being used. If the second user 122 subsequently sends a request, via the second CPE device 118, to receive data from the second data source 120, an additional portion of the router's capacity to distribute data will be required. For example, the request may include an Internet Group Management Protocol (IGMP) multicast group join request to join a multicast group associated with the second data source 120. In response to receiving the request to send the data from the second data source 120, the router 106 may determine whether a first threshold amount of the router's capacity is being used. If the first threshold amount of the router's capacity is not being used, the router 106 may send the data from the second data source 120. For example, where the distribution network 104 is part of an IPTV system, the router 106 may join the second CPE device 118 to the multicast group associated with the second data source 120. Additionally, the router 106 may request the data from the content server 102.

In a particular embodiment, if the first threshold amount of the router's capacity is being used, the router 106 may determine whether a second threshold amount of the router's capacity is being used. The second threshold may be established such that, when the second threshold is not met, at least one additional channel can be added without the router 106 exceeding its capacity. For example, the second threshold may be set such that the difference between the second threshold and the router's total capacity includes at least enough capacity for one data source to be added. To illustrate, when the distribution network 104 includes an IPTV network and the capacity limit includes a bandwidth capacity limitation, each standard definition channel may use about 4 Mbps, and each high definition channel may use about 10 Mbps. If the router's total bandwidth capacity is 200 Mbps, then the second threshold may be set at or below about 190 Mbps so that at least one high definition channel can be added if the second threshold has not been reached. In a particular embodiment, if the second threshold amount of the router's capacity is being used, the router 106 may not send the requested data.

In a particular embodiment, if the first threshold amount of the router's capacity is being used, the router 106 may determine whether the second data source 120 meets a popularity criterion. For example, the router 106 may access popularity data 124 to determine whether the second data source 120 meets the popularity criterion. The popularity data 124 may include historical popularity data, such as Nielsen ratings associated with a channel or program; projected popularity data, such as marketing projections; assigned popularity data; other data estimating the popularity of the data source or specific content available via the data source; or any combination thereof. In an illustrative embodiment, the popularity data 124 may include a list of popular data sources. The content sources may be assigned to or excluded from the list of popular data sources based on historical popularity data, projected popularity data, other data estimating the popularity of the data source, or any combination thereof. In particular illustrative embodiment, the popularity criterion may include a threshold popularity value, such as a threshold ratings value or any other measure of popularity, such as whether or not the data source is on a list of popular data sources.

In a particular embodiment, if the second data source 120 meets the popularity criterion the router 106 may send the requested data. For example, the router 106 may join the second CPE device 118 to a multicast group associated with the second data source 120 and may request that data associated with the second data source 120 be sent to the router 106. If the second data source 120 does not meet the popularity criterion, the router 106 may not send the data.

In a particular embodiment, the content server 102 or another device associated with the distributed network 104 may control whether the router 106 sends the requested data. For example, the content server 102 may determine whether the first threshold is exceeded at the router 106. In another example, the content server 102 may determine whether the second threshold is exceeded at the router 106. In another example, the content server 102 may determine whether a data source meets the popularity criterion based on the popularity data 124. The content server 102 or other device may authorize the router 106 to send the data based one or more of the determinations.

Figure 2:
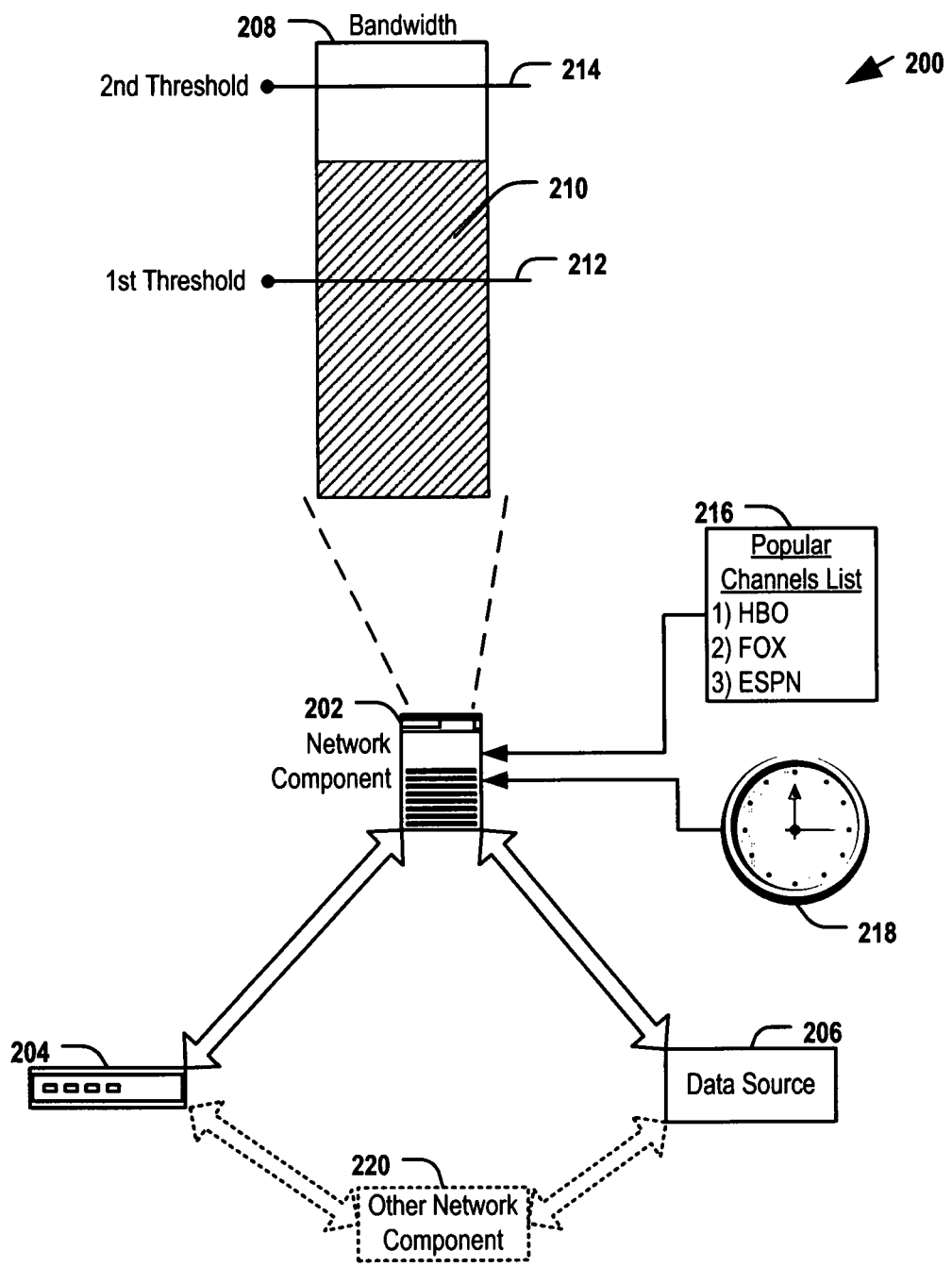
FIG. 2 is a block diagram of a second embodiment of a system to control communication of data.

FIG. 2 is a block diagram of a second embodiment of a system to control communication of data, generally designated 200. The system 200 includes a network component 202 receiving data from a data source 206 and sending data to a user device 204. The network component 202 has a limited capacity to distribute data illustrated by bandwidth 208. Additionally, some portion of the bandwidth 208 is being used to distribute other data as illustrated by used bandwidth 210.

In a particular embodiment, the user device 204 may send a request for data associated with the data source 206. For example, the user device 204 may send an Internet Group Management Protocol (IGMP) multicast group join request to join a multicast group associated with the data source 206. In response to the request, the network component 202 may determine whether a first capacity threshold is being exceeded. For example, the network component 202 may determine whether the used bandwidth 210 exceeds a first bandwidth threshold 212. In an illustrative embodiment, when the used bandwidth 210 does not exceed the first bandwidth threshold 212, the network component 202 may request the data associated with the data source 206, and may send the data to the user device 204. In another illustrative embodiment, when the used bandwidth 210 does not exceed the first bandwidth threshold 212, the network component 202 may authorize sending of the requested data to the user device 204 by another network component 220.

In a particular embodiment, when the used bandwidth 210 exceeds the first bandwidth threshold 212, the network component 202 may determine whether the used bandwidth 210 exceeds a second bandwidth threshold 214. If the used bandwidth exceeds the second threshold 214, the network component 202 may not send the requested data.

In a particular embodiment, when the used bandwidth 210 exceeds the first bandwidth threshold 212 and does not exceed the second bandwidth threshold 214, the network component 202 may determine whether the data source 206 meets a popularity criterion. For example, the network component 202 may access a list of popular data sources, such as a popular channels list 216. Channels identified on the popular channels list 216 may be considered to be popular based on historical demand for the channels, projected demand for the channels or particular programs associated with the channels, other popularity estimates, or any combination thereof. In a particular embodiment, the popular channels list 216 may be specific to a given market area, such as a neighborhood, city, state, region, country or other geographic or demographic market area. In a particular embodiment, the popular channels list 216 may be specific to a time of day or other time period 218. For example, channels with popular day time television programs may be included in the popular channels list 216 during morning hours and excluded from the popular channels list 216 during evening hours. Likewise, channels with popular "prime time" programs may be included in the popular channels list 216 in during evening hours and excluded from the popular channels list 216 during early morning hours. In a particular embodiment, the popular channel list 216 may include a list of channels sorted by popularity (e.g., ratings), and the popularity criterion may include a threshold popularity value. When the data source 206 meets the popularity criterion, the network component 202 may request the data associated with the data source 206, and may send the data to the user device 204. In another example, when the data source 206 meets the popularity criterion, the network component 202 may authorize sending of the requested data to the user device 204 by another network component 220. When the data source 206 does not meet the popularity criterion, the network component 202 may not send the requested data.

Figure 3:
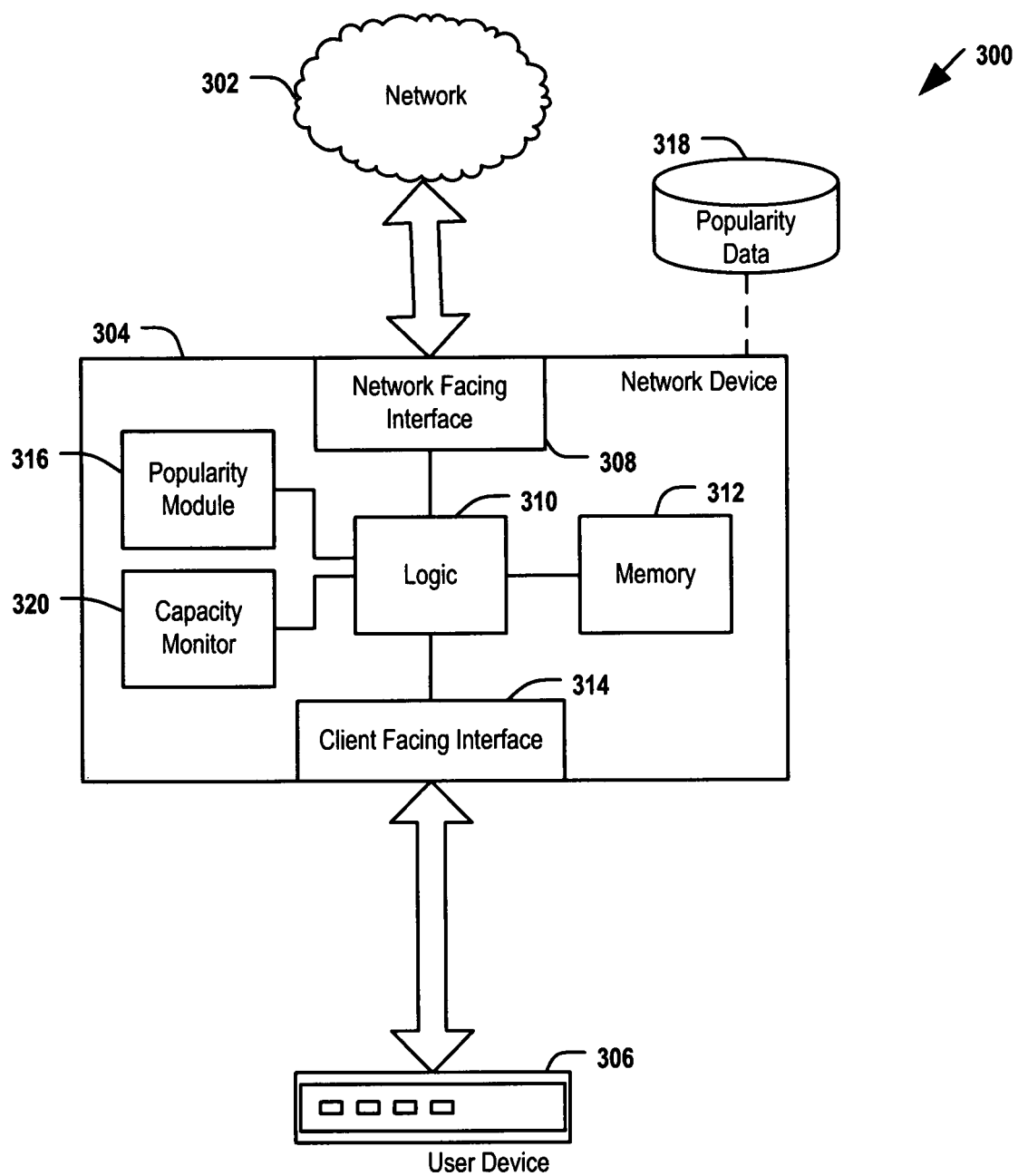
FIG. 3 is a block diagram of a third embodiment of a system to control communication of data.

FIG. 3 is a block diagram of a third embodiment of a system to control communication of data, generally designated 300. The system 300 includes a network device 304 communicating with a network 302 and a user device 306. In a particular embodiment, the user device 306 may send requests for data associated with particular data sources that are available via the network 302 to the network device 304. Additionally, data sources may send data via the network 302 to the user device 306. In a particular embodiment, the network device 304 may be part of a communication path from the network 302 to the user device 306. That is, the network device 304 may receive data from the network 302 and may send the data to the user device 306. In another particular embodiment, the network device 304 may control another device in the communication path from the network 302 to the user device 306. In this embodiment, the network device 304 may authorize another network device in the communication path from the network 302 to the user device 306 to send the data.

In a particular embodiment, the network device 304 may include a network facing interface 308 to communicate via the network 302, and a client facing interface 314 to communication with one or more client devices. For example, the network device 304 may receive a request for data associated with a particular data source via the client facing interface 314. The network device 304 may also send the requested data to the user device 306 via the client facing interface 314.

In a particular embodiment, the network device 304 may include a capacity monitor 320. The capacity monitor may determine what portion of the capacity of the network device 304 is being used. For example, the capacity monitor 320 may determine how much bandwidth the network device 304 is using or has set aside for quality of service purposes. The capacity monitor 320 may also determine whether the network device 304 is exceeding a capacity threshold. For example, the capacity monitor 320 may determine whether the network device 304 is exceeding a first capacity threshold or a second capacity threshold. In a particular embodiment, if the network device 304 is not exceeding the first capacity threshold the network device 304 may respond to a request for data by providing the requested data. In a particular embodiment, if the network device 304 is exceeding the second capacity threshold, the network device 304 may not respond to a request for data by providing the data.

In a particular embodiment, the network device 304 also includes a popularity module 316. If the network device 304 is exceeding the first capacity threshold and is not exceeding the second capacity threshold, the popularity module 316 may determine whether a data source associated with the requested data meets a popularity criterion. For example, the popularity module 316 may access popularity data 318 to determine whether the data source meets the popularity criterion.

In a particular embodiment, the network device 304 may also include logic 310. The logic 310 may authorize the sending of the requested data when the data source meets the popularity criterion. In a particular embodiment, the popularity module 316, the capacity monitor 320, or both may be implemented in hardware. In another particular embodiment, the popularity module 316, the capacity monitor 320, or both may be implemented in software stored in a memory 312 and executable by the logic 310.

Figure 4:
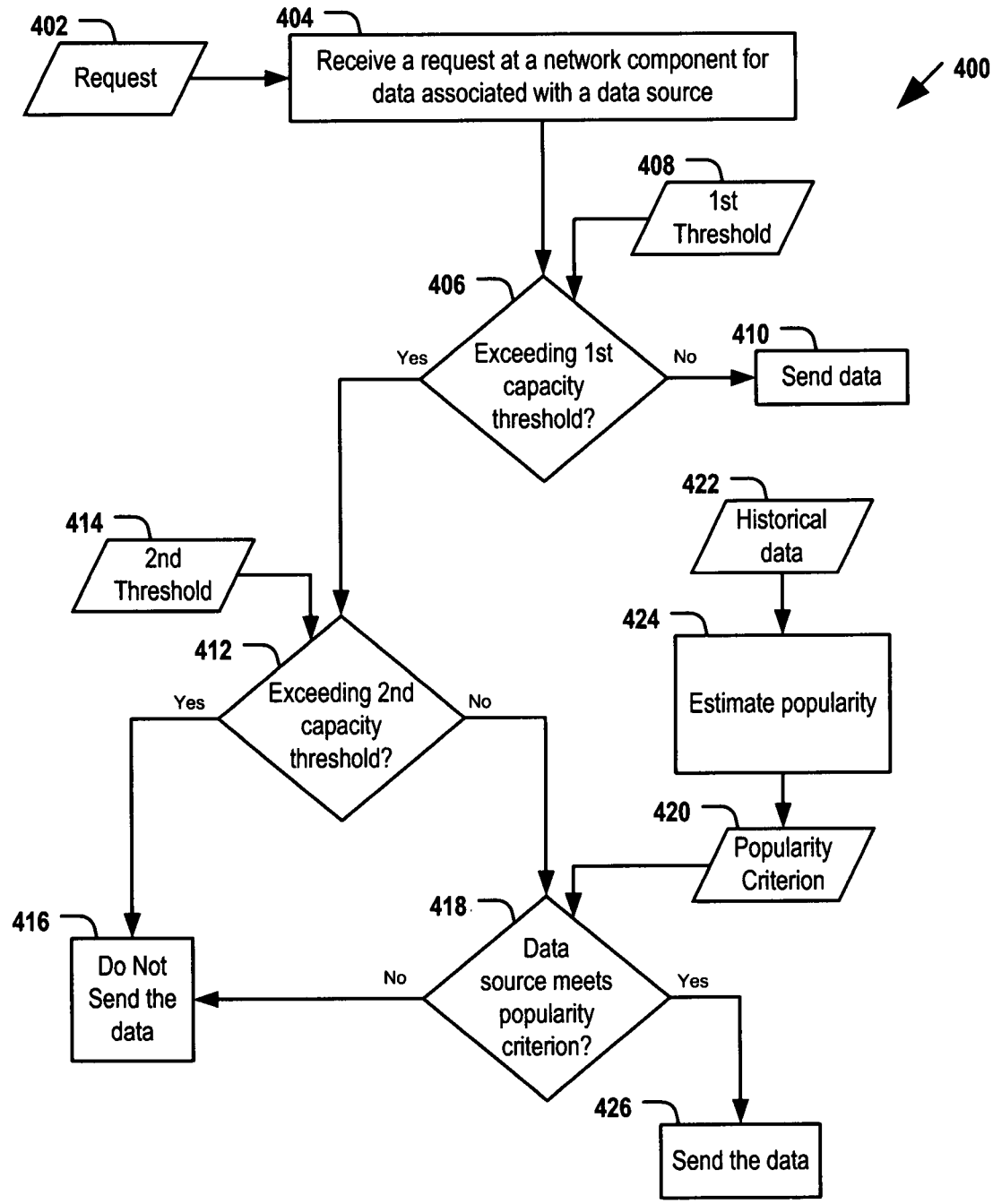
FIG. 4 is a flow diagram of a first embodiment of a method of controlling communication of data.

FIG. 4 is a flow diagram of a first embodiment of a method of controlling communication of data, generally designated 400. The method 400 includes, at 404, receiving, at a network component, a request 402 for data associated with a data source. In a particular embodiment, the network component may be a node of a multicast video distribution network, such as a router or content server of an Internet Protocol Television (IPTV) system, and the request 402 may include a request to join a multicast group associated with an IPTV channel. For example, the network component may include a router associated with an IPTV distribution network. In a particular embodiment, the network component may not be receiving data associated with the data source when the request 402 for data is received. That is, providing the data may require the use of additional capacity of the network device.

In a particular embodiment, the network component has a limited capacity to distribute data, and the method 400 includes, at 406, determining whether the network component is exceeding a first capacity threshold 408. For example, the network component may have a limited bandwidth and the first capacity threshold may include a portion of the limited bandwidth. If the network component is not exceeding the first capacity threshold 408, the method 400 may include, at 410, sending the requested data.

In a particular embodiment, if the network component is exceeding the first capacity threshold 408, the method 400 may include, at 412, determining whether the network component is exceeding a second capacity threshold 414. If the network component is exceeding the second capacity threshold 414, the method 400 may include, at 416, inhibiting the network component from sending the requested data.

In a particular embodiment, if the network component is not exceeding the second capacity threshold 414, the method 400 may include, at 418, determining whether the data source meets a popularity criterion 420. In an illustrative embodiment, determining whether the data source meets the popularity criterion 420 may include accessing predetermined popularity data associated with the data source, such as ratings information, market forecasts, historical data, any other popularity data, or any combination thereof. For example, when the data source is associated with a television channel, determining whether the data source meets a popularity criterion 420 may include accessing program ratings associated with the television channel or with particular programs associated with the television channel. In an illustrative embodiment, determining whether the data source meets a popularity criterion 420 may include accessing a list of popular data sources, such as a list of popular channels.

In a particular embodiment, the method 400 may include, at 424, estimating a popularity measure associated with the data source. For example, an expected popularity may be assigned to the data source based on expected popularity information related to the specific content associated with the data. To illustrate, the popularity of a television channel may be estimated based on ratings of particular programs associated with the television channel. The estimated popularity may also be assigned based on historical data 422, such a previous requests to access the data. In a particular embodiment, the estimated popularity may be based on a time of day associated with the received request. For example, if the request is received during the morning, a data source associated with content that is popular in the morning may have a higher popularity estimate that a data source associated with content that is popular in the evening.

In a particular embodiment, when the data source does not meet the popularity criterion 420, the method 400 may include, at 416, not sending the data. In a particular embodiment, when the data source does meet the popularity criterion 420, the method 400 may include, at 426, sending the data. In another particular embodiment, when the data source does meet the popularity criterion 420, the method 400 may include authorize sending of the data. For example, the method 400 may include joining a device associated with the request to a multicast group associated with the data source.

In conjunction with the configuration of structure described herein, the systems and methods disclosed control communication of data. In a particular illustrative embodiment, a network component receives a request to access data associated with a data source. The network component determines whether it is exceeding a first capacity threshold. If the network component is exceeding the first capacity threshold, the network component may determine whether it is exceeding a second capacity threshold. If the network component is not exceeding the second capacity threshold, the network component determines whether the data source meets a popularity criterion. If the data source meets the popularity criterion, the network component sends the requested data. If the data source does not meet the popularity criterion, the network component does not send the requested data.

Figure 5:
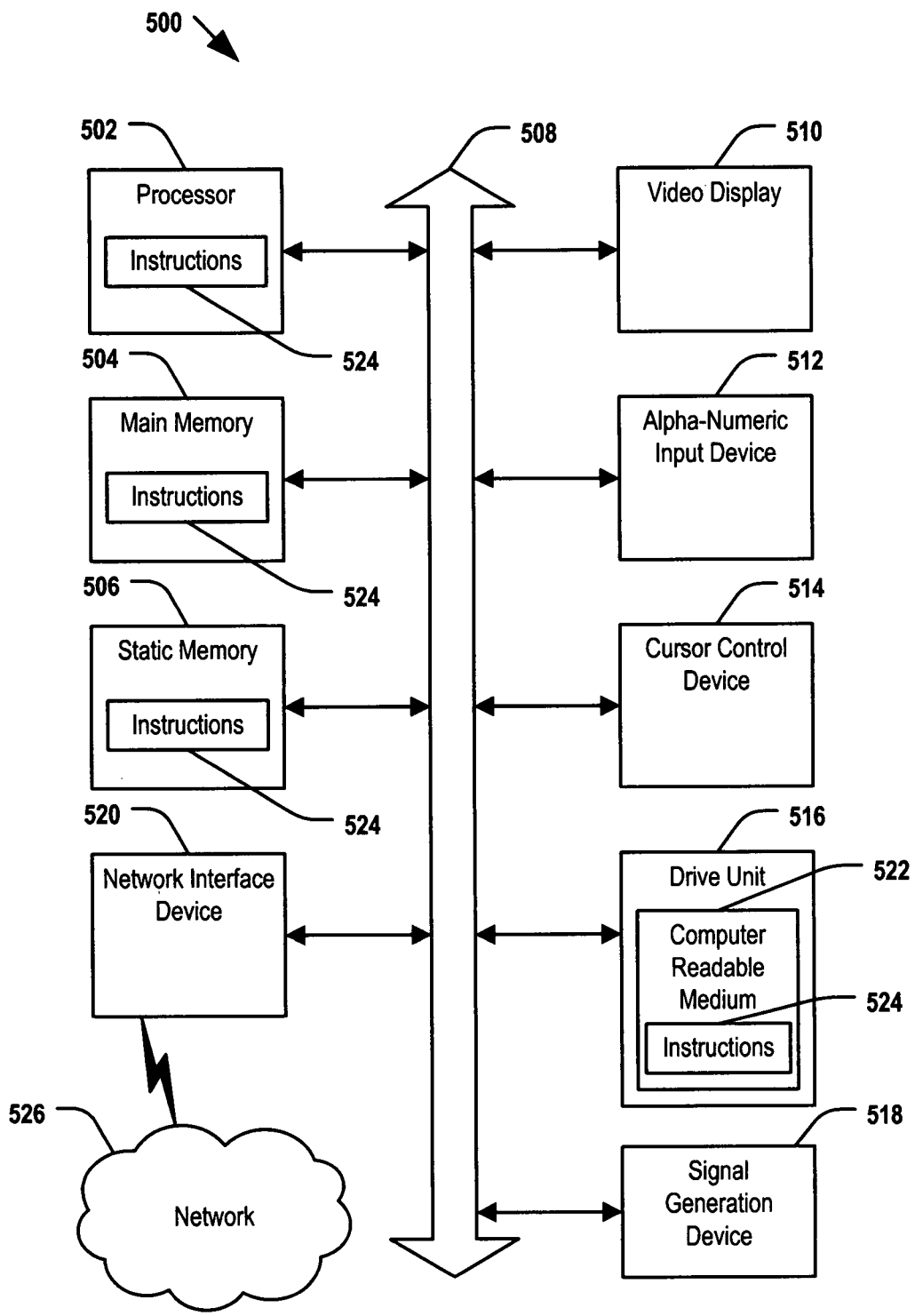
FIG. 5 is a block diagram of an illustrative embodiment of a computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, including a data source, content server, router, network device, network component, customer premises equipment device, or user device, as shown in FIGS. 1-3.

In a networked deployment, the computer system may operate in the capacity of an IPTV server, such as a video server or application server, or a set-top box device. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile)

memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving, at a network component device, a request for data associated with a data source, wherein the network component device has a limited capacity to distribute data;
    determining, after receiving the request, whether a capacity of the network component device exceeds a first distribution capacity threshold;
    in response to determining that the capacity of the network component device exceeds the first distribution capacity threshold, determining whether the capacity of the network component device exceeds a second distribution capacity threshold, wherein a difference between the limited capacity of the network component device and the second distribution capacity threshold is greater than a bandwidth of a single high definition television channel;
    in response to determining that the capacity of the network component device does not exceed the second distribution capacity threshold, determining whether the data source satisfies a popularity criterion; and
    sending the data associated with the data source in response to determining that the data source satisfies the popularity criterion when the capacity of the network component device does not exceed the second distribution capacity threshold.

2. The method of claim 1, wherein the request comprises a request to join a multicast group associated with an Internet Protocol Television channel.

3. The method of claim 2, wherein the network component device comprises a router associated with an Internet Protocol Television distribution network, wherein the router has a limited bandwidth, wherein the first distribution capacity threshold comprises a portion of the limited bandwidth, and wherein, when one or more Internet Protocol Television channels being sent via the router use bandwidth exceeding the first distribution capacity threshold, an additional Internet Protocol Television channel is not allowed to be sent via the router unless the additional Internet Protocol Television channel satisfies the popularity criterion.

4. The method of claim 3, wherein, when the one or more Internet Protocol Television channels being sent via the router use bandwidth exceeding the second distribution capacity threshold, the additional Internet Protocol Television channel is not allowed to be sent via the router.

5. The method of claim 1, wherein the network component device comprises a node of a multicast video distribution network.

6. The method of claim 1, wherein the network component device comprises a router.

7. The method of claim 1, wherein the network component device comprises a content server.

8. The method of claim 1, wherein determining whether the data source satisfies the popularity criterion comprises determining whether the data source is on a list of popular data sources.

9. The method of claim 1, wherein determining whether the data source satisfies the popularity criterion is based at least partially on a time of day associated with the request for data received at the network component device.

10. The method of claim 1, further comprising assigning an expected popularity to the data source based at least partially on content associated with the data.

11. The method of claim 10, wherein the expected popularity is assigned based on historical data.

12. The method of claim 1, wherein the data associated with the data source comprises content associated with a television channel.

13. The method of claim 1, wherein the limited capacity to distribute data comprises a bandwidth limitation.

14. The method of claim 1, further comprising sending the data associated with the data source, when the capacity of the network component device has not exceeded the first distribution capacity threshold.

15. A system comprising:
a processor; and
a memory coupled to the processor, the memory storing instructions to cause the processor to perform a method comprising:
receiving a request at a network component for data associated with a data source, wherein the network component has a limited capacity to distribute data;
determining, after receiving the request, whether a capacity of the network component exceeds a first distribution capacity threshold;
in response to determining that the capacity of the network component exceeds the first distribution capacity threshold, determining whether the capacity of the network component exceeds a second distribution capacity threshold, wherein a difference between the limited capacity of the network component and the second distribution capacity threshold is greater than a bandwidth of a single high definition television channel;
determining whether the data source satisfies a popularity criterion, when in response to determining that the capacity of the network component does not exceed the second distribution capacity threshold; and
sending the data associated with the data source in response to determining that the data source satisfies the popularity criterion when the capacity of the network component does not exceed the second distribution capacity threshold.

16. The system of claim 15, wherein determining whether the capacity of the network component exceeds the first distribution capacity threshold comprises determining available bandwidth for use to send the data associated with the data source and comparing the available bandwidth to a first bandwidth threshold.

17. The system of claim 15, wherein the request comprises an Internet Group Management Protocol multicast group join request.

18. The system of claim 15, wherein the popularity criterion includes a threshold ratings value.

19. A non-transitory processor-readable storage medium including processor-readable instructions executable by a processor to perform a method comprising:
determining, in response to a request received at a network component for data associated with a data source, whether a capacity of the network component exceeds a first distribution capacity threshold, wherein the network component has a limited capacity to distribute data;
determining, in response to determining that the capacity of the network component exceeds the first distribution capacity threshold, whether the capacity of the network component exceeds a second distribution capacity threshold, wherein a difference between the limited capacity of the network component and the second distribution capacity threshold is greater than a bandwidth of a single high definition television channel;
determining, in response to determining that the capacity of the network component does not exceed the second distribution capacity threshold, whether the data source satisfies a popularity criterion; and
sending the data associated with the data source in response to determining that the data source satisfies the popularity criterion when the capacity of the network component does not exceed the second distribution capacity threshold;
wherein the network component is configured to send data of a single additional high definition television channel when the capacity of the network component exceeds the first distribution capacity threshold and the capacity of the network component does not exceed the second distribution capacity threshold.

20. The non-transitory processor-readable storage medium of claim 19, wherein the method further comprises joining a device associated with the request to a multicast group associated with the data source.

21. The non-transitory processor-readable storage medium of claim 19, wherein determining whether the data source satisfies the popularity criterion further comprises accessing predetermined popularity data associated with the data source.

22. The non-transitory processor-readable storage medium of claim 19, wherein the data source comprises a television channel, and wherein determining whether the data source satisfies the popularity criterion further comprises accessing program ratings associated with the television channel.

23. The non-transitory processor-readable storage medium of claim 19, wherein determining whether the data source satisfies the popularity criterion further comprises accessing a list of popular data sources.

24. The non-transitory processor-readable storage medium of claim 19, wherein determining whether the data source satisfies the popularity criterion further comprises estimating a popularity measure associated with the data source.

25. The method of claim 1, wherein the network component device is configured to send data of a single additional high definition television channel when the capacity of the network component device exceeds the first distribution capacity threshold and the capacity of the network component device does not exceed the second distribution capacity threshold.

26. The method of claim 1, wherein the bandwidth of the single high definition television channel is approximately 10 megabits per second.

* * * * *